US007596380B2

(12) United States Patent
Kim

(10) Patent No.: US 7,596,380 B2
(45) Date of Patent: Sep. 29, 2009

(54) CHANGING SERVING RADIO NETWORK CONTROLLER FOR MOBILE TERMINAL SUPPORTING MULTIMEDIA BROADCAST SERVICES

(75) Inventor: Myeong-Cheol Kim, Aachen (DE)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 11/189,206

(22) Filed: Jul. 25, 2005

(65) Prior Publication Data
US 2006/0035645 A1 Feb. 16, 2006

Related U.S. Application Data

(60) Provisional application No. 60/591,436, filed on Jul. 26, 2004, provisional application No. 60/601,267, filed on Aug. 12, 2004.

(51) Int. Cl.
*H04Q 7/20* (2006.01)
(52) U.S. Cl. ............. 455/452.1; 455/461; 455/445; 455/442; 455/436; 455/450; 370/349; 370/401; 370/336
(58) Field of Classification Search ............. 455/452.1, 455/414.1, 446, 450, 560, 442, 436; 370/312, 370/328
See application file for complete search history.

(56) References Cited

U.S. PATENT DOCUMENTS

| 6,961,571 | B1* | 11/2005 | Rune et al. ............. 455/442 |
| 2003/0003919 | A1* | 1/2003 | Beming et al. ............. 455/446 |
| 2004/0066774 | A1* | 4/2004 | Kawaguchi et al. ......... 370/349 |
| 2004/0253959 | A1* | 12/2004 | Hwang et al. ............. 455/450 |
| 2005/0075099 | A1* | 4/2005 | Guyot ..................... 455/414.1 |

* cited by examiner

*Primary Examiner*—Charles N Appiah
*Assistant Examiner*—Michael T Vu
(74) *Attorney, Agent, or Firm*—Lee, Hong, Degerman, Kang & Waimey

(57) ABSTRACT

The present invention relates to transmitting information regarding a point-to-multipoint service a mobile terminal has joined a target radio network controller (TRNC) during SRNS Relocation. A serving radio network controller (SRNC) initiates the relocation by transmitting a first message for requiring the relocation, wherein the first message includes a message container comprising the information regarding the point-to-multipoint service the mobile terminal has joined. A core network (CN) receives the first message and transmits a relocation request to the TRNC, wherein the relocation request includes the message container. The TRNC transmits a relocation request acknowledgment to the CN to confirm or reject the relocation. The CN sends a relocation command to the SRNC to trigger the relocation. A relocation trigger is then transmitted to the mobile terminal for triggering the relocation and a relocation acknowledgment is received in the TRNC from the mobile terminal.

14 Claims, 14 Drawing Sheets

CHANGING SERVING RADIO NETWORK CONTROLLER FOR MOBILE TERMINAL SUPPORTING MULTIMEDIA BROADCAST SERVICES

CROSS-REFERENCE TO RELATED APPLICATIONS

Pursuant to 35 U.S.C. § 119(e), this application claims the benefit of earlier filing date and right of priority to U.S. Provisional Application No. 60/591,436, filed on Jul. 26, 2004, and U.S. Provisional Application No. 60/601,267, filed on Aug. 12, 2004, the contents of which are hereby incorporated by reference herein in their entirety.

FIELD OF THE INVENTION

The present invention relates to informing a radio network controller (RNC) about a point-to-multipoint service a user equipment (UE) has joined, and more specifically, to informing a target RNC (TRNC) about a point-to-multipoint service the UE has subscribed to before Serving Radio Network Subsystem (SRNS) Relocation.

BACKGROUND OF THE INVENTION

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a mobile terminal (or user equipment: UE) 10, a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200.

The Node-Bs 112, 113 receive information sent by the physical layer of the terminal through an uplink, and transmit data to the terminal through a downlink. The Node-Bs 112, 113, thus, operate as access points of the UTRAN 100 for the terminal.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node (GGSN) 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as "Iu-PS," and the Iu interface between the RNCs 111 and the core network 200 for circuit switched systems is defined as "Iu-CS."

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

A Multimedia Broadcast/Multicast Service (MBMS or "MBMS service") refers to a method of providing streaming or background services to a plurality of UEs using a down-link-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

For purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data.

The different logical channels that exist are listed below:

| Control Channel (CCH) | Broadcast Control Channel (BCCH) |
| --- | --- |
| | Paging Control Channel (PCCH) |
| | Dedicated Control Channel (DCCH) |
| | Common Control Channel (CCCH) |
| | Shared Channel Control Channel (SHCCH) |
| | MBMS point-to-multipoint Control Channel (MCCH) |
| Traffic Channel (TCH) | Dedicated Traffic Channel (DTCH) |
| | Common Traffic Channel (CTCH) |
| | MBMS point-to-multipoint Traffic Channel (MTCH) |

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

The MAC-c/sh sub-layer manages a common transport channel, such as a forward access channel (FACH) or a downlink shared channel (DSCH), which is shared by a plurality of terminals, or in the uplink the Radio Access Channel (RACH). In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sublayer exists in each terminal (UE). Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a 'CB message', hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, a function called header compression.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The different possibilities that exist for the mapping between the radio bearers and the transport channels are not always possible. The UE/UTRAN deduces the possible mapping depending on the UE state and the procedure that the UE/UTRAN is executing. The different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network. Specifically, the core network can only detect the existence of idle mode terminals within a region that is larger than a cell, such as a location or a routing area. Therefore, the existence of idle mode terminals is determined within large regions. In order to receive mobile communication services such as voice or data, the idle mode terminal must move or change into the RRC connected mode. The possible transitions between modes and states are shown in FIG. 5.

A UE in RRC connected mode can be in different states, such as a CELL_FACH state, a CELL_PCH state, a CELL_DCH state or a URA_PCH state. Depending on the states, the UE listens to different channels. For example a UE in CELL_DCH state will try to listen (amongst others) to DCH type of transport channels, which comprises DTCH and DCCH transport channels, and which can be mapped to a certain DPCH. The UE in CELL_FACH state will listen to several FACH transport channels which are mapped to a certain S-CCPCH physical channel. The UE in PCH state will listen to the PICH channel and to the PCH channel, which is mapped to a certain S-CCPCH physical channel.

The UE also carries out different actions depending on the state. For example, based on different conditions, a UE in CELL_FACH will start a CELL Update procedure each time the UE changes from the coverage of one cell into the coverage of another cell. The UE starts the CELL Update procedure by sending to the NodeB a Cell Update message to indicate that the UE has changed its location. The UE will then start listening to the FACH. This procedure is additionally used when the UE comes from any other state to CELL_FACH state and the UE has no C-RNTI available, such as when the UE comes from the CELL_PCH state or CELL_DCH state, or when the UE in CELL_FACH state was out of coverage.

In the CELL_DCH state, the UE is granted dedicated radio resources, and may additionally use shared radio resources. This allows the UE to have a high data rate and efficient data exchange. However, the radio resources are limited. It is the responsibility of the UTRAN to allocate the radio resources amongst the UEs such that they are efficiently used and ensure that the different UEs obtain the quality of service required.

A UE in CELL_FACH state has no dedicated radio resources attributed, and can only communicate with the UTRAN via shared channels. Thus, the UE consumes few radio resources. However, the data rate available is very limited. Also, the UE needs to permanently monitor the shared channels. Thus, UE battery consumption is increased in the case where the UE is not transmitting.

A UE in CELL_PCH/URA_PCH state only monitors the paging channel at dedicated occasions, and therefore minimizes the battery consumption. However, if the network wishes to access the UE, it must first indicate this desire on the paging occasion. The network may then access the UE, but only if the UE has replied to the paging. Furthermore, the UE can only access the network after performing a Cell Update procedure which introduces additional delays when the UE wants to send data to the UTRAN.

Main system information is sent on the BCCH logical channel, which is mapped on the P-CCPCH (Primary Common Control Physical Channel). Specific system information blocks can be sent on the FACH channel. When the system information is sent on the FACH, the UE receives the configuration of the FACH either on the BCCH that is received on the P-CCPCH or on a dedicated channel. The P-CCPCH is sent using the same scrambling code as a P-CPICH (Primary Common Pilot Channel), which is the primary scrambling code of the cell. Each channel uses a spreading code as commonly done in WCDMA (Wideband Code Division Multiple Access) systems. Each code is characterized by its spreading factor (SF), which corresponds to the length of the code. For a given spreading factor, the number of orthogonal codes is equal to the length of the code. For each spreading factor, the given set of orthogonal codes, as specified in the UMTS system, are numbered from $0$ to $SF-1$. Each code can thus be identified by giving its length (i.e. spreading factor) and the number of the code. The spreading code that is used by the P-CCPCH is always of a fixed spreading factor 256 and the number is the number 1. The UE knows about the primary scrambling code either by information sent from the network on system information of neighboring cells that the UE has read, by messages that the UE has received on the DCCH channel, or by searching for the P-CPICH, which is sent using the fixed SF 256 and the spreading code number 0, and which transmits a fixed pattern.

The system information comprises information on neighboring cells, configuration of the RACH and FACH transport channels, and the configuration of MCCH, which is a channel dedicated for MBMS service. When the UE has selected a cell (in CELL_FACH, CELL_PCH or URA_PCH state), the UE verifies that it has valid system information.

The system information is organized in SIBs (system information blocks), a MIB (Master information block) and scheduling blocks. The MIB is sent very frequently and provides timing information of the scheduling blocks and the different SIBs. For SIBs that are linked to a value tag, the MIB also contains information on the last version of a part of the SIBs. SIBs that are not linked to a value tag are linked to an expiration timer. The SIBs linked to an expiration timer become invalid and need to be reread if the time of the last reading of the SIB is larger than an expiration timer value. The SIBs linked to a value tag are only valid if they have the same value tag as a value tag broadcast in the MIB. Each block has an area scope of validity, such as a Cell, a PLMN (Public Land Mobile Network) or an equivalent PLMN, which signifies on which cells the SIB is valid. A SIB with the area scope "Cell" is valid only for the cell in which it has been read. A SIB with the area scope "PLMN" is valid in the whole PLMN. A SIB with the area scope "equivalent PLMN" is valid in the whole PLMN and equivalent PLMN.

In general, UEs read the system information when they are in idle mode, CELL_FACH state, CELL_PCH state or in URA_PCH state of the cell that they have selected, i.e., the cell that they are camping on. In the system information, the UEs receive information on the neighboring cells on the same frequency, different frequencies and different RAT (Radio access technologies). This allows the UEs to know which cells are candidates for cell reselection.

The 3GPP system can provide multimedia broadcast multicast service (MBMS). The 3GPP TSG SA (Service and System Aspect) defines various network elements and their functions required for supporting MBMS services. A cell broadcast service provided by the prior art is limited to a service in which text type short messages are broadcast to a certain area. The MBMS service, however, is a more advanced service that multicasts multimedia data to terminals (UEs) that have subscribed to the corresponding service in addition to broadcasting multimedia data.

The MBMS service is a downward-dedicated service that provides a streaming or background service to a plurality of terminals by using a common or dedicated downward channel. The MBMS service is divided into a broadcast mode and a multicast mode. The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

FIG. 6 illustrates a process of providing a particular MBMS service, by using the multicast mode. The procedure can be split into two types of actions, those that are transparent and those that are not transparent to the UTRAN.

The transparent actions are described in the following. A user desiring to receive the MBMS service, first needs to subscribe in order to be allowed to receive MBMS services, to receive information on MBMS services, and to join a certain set of MBMS services. A service announcement provides the terminal with a list of services to be provided and other related information. The user can then join these services. By joining, the user indicates that the user wants to receive information linked to services that the user has subscribed to and becomes part of a multicast service group. When a user is no longer interested in a given MBMS service, the user leaves the service, i.e., the user is no longer part of the multicast service group. These actions can be taken by using any means of communication, i.e., the actions may be done using SMS (Short Messaging Service), or by Internet access. These actions do not have to necessarily be done using the UMTS system.

In order to receive a service for which the user is in a multicast group the following actions that are not transparent to the UTRAN are executed. The SGSN informs the RNC about a session start. Then the RNC notifies the UEs of the multicast group that a given service has started in order to initiate reception of the given service. After having broadcast the necessary UE actions and eventually the configuration of the PtM bearers for the given service the transmission of the data starts. When the session stops, the SGSN indicates the stopped session to the RNC. The RNC in turn initiates a session stop. The transmission of the service from the SGSN means for the RNC to provide a bearer service for conveying the data of the MBMS service.

After the notification procedure, other procedures can be initiated between the UE and the RNC and the SGSN to enable data transmission, such as RRC connection establishment, connection establishment towards the PS domain, frequency layer convergence, and counting.

Reception of an MBMS service may be performed in parallel to the reception of other services, such as a voice or video call on the CS domain, SMS transfer on the CS or PS domain, data transfer on the PS domain, or any signaling related to the UTRAN or PS or CS domain.

Contrary to the multicast service, for broadcast services, as shown in FIG. 7, only the announcement of the service must be done in a transparent manner. No subscription or joining is needed. Afterwards, the actions that are transparent to the RNC are the same as for multicast services.

Referring to FIG. 8, a typical session sequence from a UTRAN perspective is illustrated. As shown, the SGSN informs the RNC about a session start (step 1). The RNC may then perform a counting procedure, which triggers some UEs to establish a connection to the PS domain (step 2). Consequently, the establishment of an RRC connection for the UEs is initiated. This allows the RNC to estimate the number of UEs in a given cell that are interested in the service. When the UE has established the PS connection, the SGSN initiates the Iu linking procedure, which provides the list of multicast services the UE has joined to the RNC.

For UEs that have an RRC connection established, and which are interested in the given MBMS service but are not connected to the PS domain, the RNC sends a specific message to the UEs triggering them to establish a PS connection (step 3). When the UE has established the PS connection, the SGSN initiates the Iu linking procedure, which provides the list of multicast services the UE has joined to the RNC. For UEs that are not in a CELL_DCH state, a frequency layer convergence scheme allows the RNC to trigger the UEs to change the frequency to which they listen (step 4).

Depending on a Radio Resource Management (RRM) scheme, the RNC establishes point-to-multipoint (PtM) or point-to-point (PtP) radio bearers for delivering the MBMS service (step 5a or 5b). The RNC delivers data received from the SGSN to the UEs that are part of the multicast group. After the transmission of the data, the SGSN informs the RNC about the end of the sessions (step 6). The RNC then releases the PtP or PtM radio bearers used for transmitting the MBMS data (step 7a or 7b).

Generally, for UEs in an RRC connected state, two possibilities exist. The UE will either have a connection established with the PS domain (PMM connected) or the UE will have no connection established with the PS domain (PMM idle mode). When there is no connection established with the PS domain, the UE will normally have a connection with the CS domain. Otherwise, the UE is not in an RRC connected mode.

For UEs connected to the PS domain, an MBMS session may be handled in accordance with FIG. 9. As shown, a method for receiving in a target RNC information about services a UE has joined is explained.

Referring to FIG. 9, the UE and the RNC initially establish an RRC connection (step 1). During the establishment of the RRC connection, the UE may indicate to the RNC that it has joined an MBMS service or provide a list of joined services (step 2). The UE may do this in a RRC Connection Request message or in a RRC Connection Setup Complete message. However, because the exchange of these messages is neither integrity protected nor ciphered, the RNC can not trust this information.

Generally, for a PS-connected UE, the RNC receives the information about the joined services automatically when the UE establishes the PS connection with a UE linking procedure. However, the UE cannot always know whether a PS connection will be later established.

At the establishment of the PS connection (step 3), the UE may provide the RNC with information as to what MBMS services the UE has joined or even provide the list of joined services (step 2b). However, providing the information at this time is not necessary because the RNC receives the information via the UE linking procedure under normal circumstances. Preferably, once the UE has established the PS connection, the SGSN initiates the UE Linking procedure (step 4) and provides the RNC with the list of services the UE has joined.

Still referring to FIG. 9, the SGSN informs the RNC about a session start (step 5). The RNC then establishes PtP or PtM radio bearers dependent on the type of bearers needed (step 6a or 6b). The SGSN also informs the RNC about a session end (step 7). Upon the session end, the RNC releases the PtP or PtM radio bearers (step 8a or 8b).

For UEs not connected to the PS domain, an MBMS session may be handled in accordance with FIG. 10.

Referring to FIG. 10, the UE and the RNC initially establish an RRC connection (step 1). During the establishment of the RRC connection, the UE may indicate to the RNC that it has joined an MBMS service or provide a list of joined services (step 2). The UE may do this in a RRC Connection Request message or in a RRC Connection Setup Complete message. However, because the exchange of these messages is neither integrity protected nor ciphered, the RNC can not trust this information.

Generally, for a PS-connected UE, the RNC receives the information about the joined services automatically when the UE establishes a PS connection with a UE linking procedure. However, the UE cannot always know whether a PS connection will be later established.

At the establishment of a CS connection (step 3), the UE may provide the RNC with information as to what MBMS services the UE has joined or even provide the list of subscribed services if not already previously done (step 2b). After the establishment of the CS connection, the RNC receives a UE identifier (e.g. IMSI) via a "Common Id" message (step 4). Using the UE identity, the RNC retrieves information about which service the UE is subscribed to from the SGSN using an MBMS Service Id Request procedure (step 5).

Afterward, the RNC is informed about a session start by the SGSN (step 6). The RNC then notifies the UE that a session is starting and prompts the UE to establish a PS connection (step 7). Upon the UE establishing a PS connection (step 8), the RNC establishes PtP or PtM radio bearers dependent on the type of radio bearers needed (step 9a or 9b). At a session end, the SGSN informs the RNC (step 10), wherein the RNC releases the PtP or PtM radio bearers (step 11a or 11b).

Generally, UEs having an RRC connection have a context with a serving RNC (SRNC), but they can also receive service via drift RNCs (DRNCs). FIG. 11 illustrates a UE having an RRC connection, wherein the UE is connected to the PS domain and the CS domain (bold lines). The serving RNC allocates a UTRAN Radio Network Temporary Identifier (U-RNTI) and controls the UE directly. The serving RNC is also connected to the CS domain and/or the PS domain. When the UE moves from the coverage area of a first cell, such as the cell controlled by a NodeB C, and into the coverage area of a second cell, such as the cell controlled by a NodeB B, the RNC of the first cell can establish a connection with the UE via an interface between the RNC of the first cell and the RNC of the second cell.

Specifically, the NodeB C is connected to the SRNC (B) by an Iub interface. However, the NodeB B is connected to a drift RNC (DRNC) (A) rather than the SRNC (B). The SRNC (B) can establish a connection with the UE moved to the coverage area of a cell controlled by the NodeB B by means of an Iur interface, which links the DRNC (A) and the SRNC (B). Because a control function is still managed by the RNC (B), the RNC B is called the serving RNC while the RNC A is the drift RNC.

When the UE in FIG. 11 leaves the coverage area of the NodeB C and is therefore only connected to cells which are controlled by the DRNC (A), it would be more efficient to move the control function of the RNC (B) to the RNC (A). This allows to limit the use of the interface Iur. Also, in case the Iur interface does not exist and the UE moves directly from the coverage area of the cells of the NodeB C to the NodeB B, the control function of the RNC B would have to be transferred to the RNC A. This procedure is called SRNS Relocation. The SRNC before the SRNS Relocation is called the SRNC. The RNC having the SRNC role after the SRNS Relocation, is called the target RNC or the target SRNC (TRNC).

FIG. 12 illustrates a method for performing SRNS Relocation. As shown, the SRNC is connected to the CS and/or PS domain established for a given UE (step 1). The SRNC initiates the SRNS Relocation by sending a "Relocation Required" message to the core network (CN) (step 2). Included in the "Relocation Required" message is a message container comprising information on a current configuration of the UE (e.g. RRC state, measurement configurations, radio bearer configurations, etc.). The message container is handled transparently by the CN.

The CN informs the TRNC that a SRNS Relocation is required by sending a "Relocation Request" message to the TRNC (step 3). This message includes the message container the RNC transmitted in the "Relocation Required" message. If the type of relocation is "UE involved," i.e., if it is the SRNC that transmits the RRC message to the UE that initiates the SRNS Relocation, this information is included in the "Relocation Required" message sent to the CN and the "Relocation Request" message sent to the TRNC.

The TRNC then sends a "Relocation Request Acknowledge" message to the CN to confirm or reject the SRNS Relocation (step 4). Subsequently, the CN sends a "Relocation Command" message to the SRNC to trigger the SRNS Relocation (step 5). In case a transparent container having a message for triggering the SRNS Relocation was included in the "Relocation Request Acknowledge" message, the transparent container is then transmitted to the SRNC via the "Relocation Command" message.

In case an Iur interface exists, the SRNC sends a "Relocation Commit" message to the TRNC (step 6). If the type of SRNS Relocation is "UE involved," the SRNC transmits a Uu message for triggering the SRNS Relocation (step 7a). However, if the type of SRNS Relocation is "UE not involved," the TRNC transmits the Uu message for triggering the SRNS Relocation upon receipt of the "Relocation Commit" message (step 7b).

The UE responds to the TRNC to acknowledge the SRNS Relocation (step 8). The TRNC then sends a "Relocation Detect" message (step 9) (after the reception of the "Relocation Commit" message or after the acknowledgment of the Uu message triggering the relocation message) and a "Relocation Complete" message (step 10) to the CN. Afterward, the CN initiates release of the Iu connection with the old RNC (steps 11 and 12).

Referring to FIG. 13, information between the RNC, the core network and the UE is exchanged through messages. The information contained in the messages is coded in a special format called Abstract syntax language (ASN.1). The ASN.1 defines information elements which correspond to integer values, enumerations of different values, sequences of bits or bytes (Bit Strings/Octet Strings) of fixed or variable lengths, etc.

Information between the source RNC and the target RNC are exchanged either as information elements (IEs) or by means of transparent containers, which are transmitted by the target/source RNC to the CN and from the CN to the target/source RNC via the Iu interface. When the information is directly coded in IEs, the message syntax of the Iu message allows to decode the information directly. Preferably, a container is a ASN.1 coded message, which is defined in another interface such as in the RRC standard, and which is inserted as a variable length bit/octet string in the Iu message, as shown in FIG. 13. A transparent container is advantageous because the syntax of the information inside the container (e.g. the message defined in the RRC specification) can be changed without changing the message that carries the container, e.g. the Iu message.

Additionally, when the UE responds to the TRNC to acknowledge the SRNS Relocation, procedures are defined to provide the RNC with the services the UE has joined. Preferably, this is done by an MBMS UE Linking procedure as shown in FIG. 14. A signaling flow is used to link a specific UE to at least one MBMS service contexts in the SRNC. The MBMS UE LINKING REQUEST message contains the entire list of MBMS Service Ids activated by the UE. If there is previously no MBMS service context related to an MBMS Service Id, then the SRNC creates an MBMS service context as a result of this procedure. This procedure could be used to inform the RNC about the MBMS services the UE has joined. However, this method is only applicable for UEs that are connected to the PS domain.

Referring to FIG. 15, an MBMS SERVICE ID REQUEST message may be used to retrieve the active services. As shown in FIG. 15, an MBMS service Id list may be sent via an Iu signaling flow. The signaling flow is applicable to providing MBMS to UEs in an RRC-connected, PMM-idle state. The list of MBMS services the user has joined is sent over an Iu interface.

The purpose of the signaling flow is to perform UE linking for an RRC-connected, PMM-idle user. An RNC needs indication that the user has joined at least one MBMS service and a PS Domain-specific IDNNS (Intra Domain NAS Node Selector) whenever an Iu-cs connection is established and the UE is PMM idle (no Iu-ps connection). The RNC requests the MBMS services the UE has joined from the SGSN (or the SGSN the UE is attached to in case of Iu-flex) using a connectionless procedure. The MBMS SERVICE ID REQ contains the IMSI of the UE. The SGSN response contains the full list of MBMS services the user has joined.

The MBMS service list is then stored in the RNC. The list is deleted when the UE moves to RRC idle and the RRC context is removed in the RNC or when the UE context is transferred to another RNC (SRNS Relocation). However, this means that at least the indication that the user has joined at least one service must be given to the target RNC in some way.

When SRNS Relocation is necessary due to the mobility of the UE, it is not clear how the target RNC receives information regarding which services the UE has joined and which services the UE wants to receive. It is important for the target RNC to be aware of the services the UE has joined as early as possible in order to keep the length of service interruption as small as possible. During SRNS Relocation, as shown in FIG. 12, the transfer of information concerning MBMS is not foreseen. Therefore, different possibilities to handle this information are proposed by the present invention.

Also, if MBMS services are provided via a PtP radio bearer, the SRNC needs to inform the TRNC about the MBMS services that are provided via the PtP radio bearer. This allows the target RNC to know the appropriate UE configuration of the UE and can continue the transmission of the MBMS service.

SUMMARY OF THE INVENTION

The present invention is directed to informing a radio network controller (RNC) about point-to-multipoint services a user equipment (UE) has joined before Serving Radio Network Subsystem (SRNS) Relocation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for transmitting information regarding a point-to-multipoint service a mobile terminal has joined to a target radio network controller (TRNC) before relocation, the method comprising informing a serving radio network controller (SRNC) of information regarding a point-to-multipoint service the mobile terminal has joined, receiving a relocation trigger for triggering the relocation, and transmitting a relocation acknowledgment to the TRNC for acknowledging the relocation.

Preferably, the relocation is initiated by a relocation required message transmitted from the serving radio network controller (SRNC) to a core network (CN) for requiring the relocation. The relocation required message includes information regarding the point-to-multipoint service the mobile terminal has joined. A relocation request is transmitted from the CN to the TRNC for requesting the relocation, wherein the relocation request comprises the information regarding the point-to-multipoint service the mobile terminal has joined. A relocation request acknowledgment is transmitted from the TRNC to the CN for confirming or rejecting the relocation. A relocation command is transmitted from the CN to the SRNC for triggering the relocation.

Preferably the information regarding the point-to-multipoint service the mobile terminal has joined is encapsulated in a message container.

In one aspect of the invention, the message container comprises a current configuration of the mobile terminal comprising at least one of an RRC state, measurement configurations, radio bearer configurations, transport channel configurations, physical channel configurations, and radio access bearer (RAB) configuration ciphering/integrity information such as protection keys.

The information regarding the point-to-multipoint service the mobile terminal has joined comprises at least one of information indicating that the mobile terminal has joined at least one point-to-multipoint service, a list of point-to-multipoint services the mobile terminal has joined, and point-to-point radio bearer configuration information for a joined point-to-multipoint service provided via a point-to-point radio bearer, wherein each service in the list of point-to-multipoint services is identified by a specific point-to-multipoint service identifier.

In another aspect of the invention, the relocation required message and the relocation request message comprise information indicating that the SRNC will transmit the relocation trigger to the mobile terminal for triggering the relocation. Preferably, the relocation trigger received by the mobile terminal for triggering the relocation is transmitted from the SRNC. However, the relocation trigger received by the mobile terminal for triggering the relocation may be transmitted from the TRNC upon receiving in the TRNC a relocation commitment from the SRNC for committing the relocation.

In another aspect of the invention, the relocation acknowledgment transmitted from the mobile terminal to the TRNC for acknowledging the relocation comprises at least one of information indicating that the mobile terminal has joined at least one point-to-multipoint service, and a list of point-to-multipoint services the mobile terminal has joined, wherein each service in the list of point-to-multipoint services is identified by a specific point-to-multipoint service identifier.

In a further aspect of the invention, the mobile terminal triggers a location area (LA)/routing area (RA) update once the relocation is complete. Preferably, the relocation is an SRNS Relocation.

In another embodiment of the present invention, a method for transmitting information regarding a point-to-multipoint service a mobile terminal has joined to a target radio network controller (TRNC) before relocation comprises initiating the relocation by transmitting a relocation required message from a serving radio network controller (SRNC) to a core network (CN) for requiring the relocation, wherein the relocation required message includes information regarding the point-to-multipoint service the mobile terminal has joined, transmitting a relocation request from the CN to the TRNC for requesting the relocation, wherein the relocation request comprises the the information regarding the point-to-multipoint service the mobile terminal has joined, transmitting a relocation request acknowledgment from the TRNC to the CN for confirming or rejecting the relocation, transmitting a relocation command from the CN to the SRNC for triggering the relocation, transmitting a relocation trigger to the mobile terminal for triggering the relocation, and receiving in the TRNC a relocation acknowledgment from the mobile terminal for acknowledging the relocation.

Preferably, the information regarding the point-to-multipoint service the mobile terminal has joined is encapsulated in a message container.

In one aspect of the invention, the message container comprises a current configuration of the mobile terminal comprising at least one of an RRC state, measurement configurations, radio bearer configurations, transport channel configurations, physical channel configurations, and radio access bearer (RAB) configuration ciphering/integrity information such as protection keys.

The information regarding the point-to-multipoint service the mobile terminal has joined comprises at least one of information indicating that the mobile terminal has joined at least one point-to-multipoint service, a list of point-to-multipoint services the mobile terminal has joined, and point-to-point radio bearer configuration information for a joined point-to-multipoint service provided via a point-to-point radio bearer, wherein each service in the list of point-to-multipoint services is identified by a specific point-to-multipoint service identifier.

Preferably, the message container is handled in a transparent way by the core network (CN). Furthermore, the Relocation Required message and the Relocation Request message comprise information indicating that the SRNC will transmit the relocation trigger to the mobile terminal for triggering the relocation.

In another aspect of the invention, the relocation trigger transmitted to the mobile terminal for triggering the relocation is transmitted from the SRNC. Alternatively, the relocation trigger transmitted to the mobile terminal for triggering the relocation is transmitted from the TRNC upon receiving in the TRNC a relocation commitment from the SRNC for committing the relocation.

The relocation acknowledgment received in the TRNC from the mobile terminal comprises at least one of information indicating that the mobile terminal has joined at least one point-to-multipoint service and a list of point-to-multipoint services the mobile terminal has joined, wherein each service in the list of point-to-multipoint services is identified by a specific point-to-multipoint service identifier. Preferably, the relocation is an SRNS Relocation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

The present invention relates to a method for informing an RNC about MBMS services a UE has joined. Specifically, the present invention is a method for informing a target RNC (TRNC) about MBMS services the UE has subscribed to before SRNS Relocation, or in general, whether a specific UE has subscribed to MBMS services. The method also provides for transmitting to the target RNC information regarding radio bearers established in the UE before the SRNS Relocation.

In accordance with the present invention, information may be transmitted via a Relocation Commit message sent on an Iur interface, a Relocation Required message sent from a serving RNC (SRNC) to a core network (CN), a Relocation Request message sent from the CN to the TRNC, or other message exchanged between the TRNC and the CN. The UE may also indicate in a Response message to the target RNC that the UE has joined MBMS services.

In accordance with the present invention, information conveyed to the target RNC comprises information indicating that the UE, for which the SRNC context is relocated, has subscribed to MBMS services. The information may also comprise an "MBMS joined service list" and an "MBMS PtP bearer configuration" information.

The MBMS joined service list comprises a list of identifiers for identifying each MBMS service. Included in the list may be a TMGI (Temporary Mobile Group Identifier), an IP multicast address, an Access Point Network (APN) or other type of MBMS identifier.

The MBMS PtP bearer configuration information comprises configuration information for PtP radio bearers and includes configuration information for an RLC entity and a PDCP entity. It further comprises information regarding which MBMS service the radio bearers are used by. Preferably, the configuration information includes for each radio bearer a TMGI, an IP multicast address, an APN or other type of identifier for identifying the MBMS service. Additionally, the configuration information comprises transport channel and physical channel information.

Figure 1:
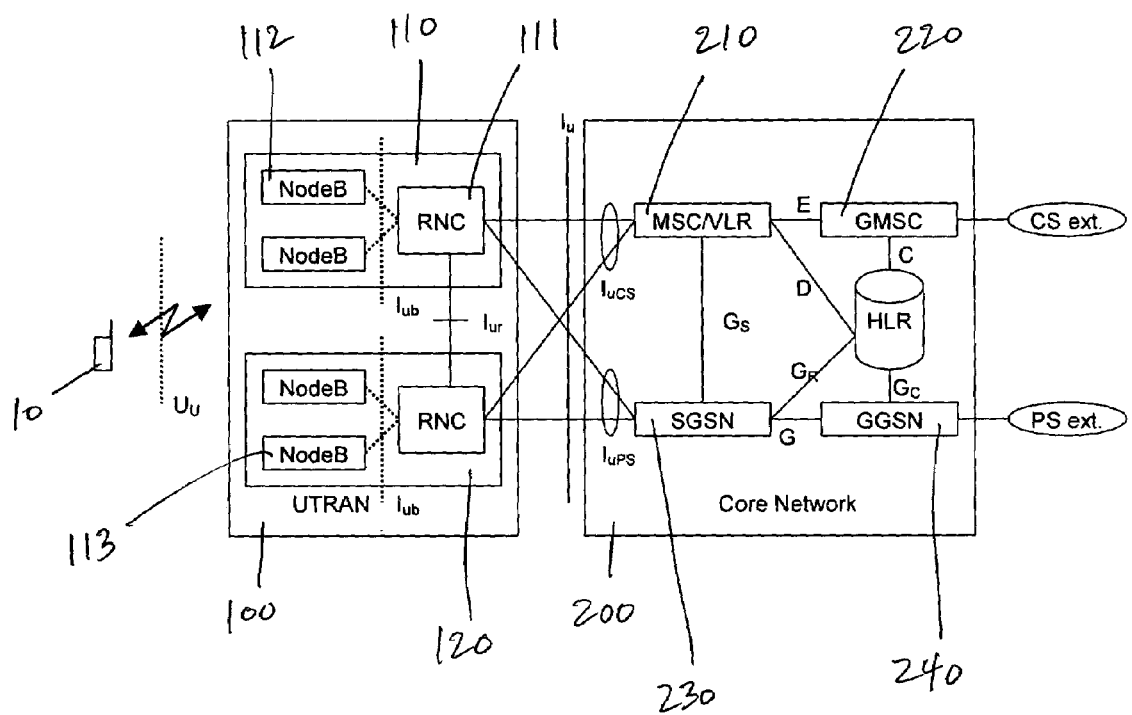
FIG. 1 is a block diagram of a general UMTS network architecture.
Figure 2:
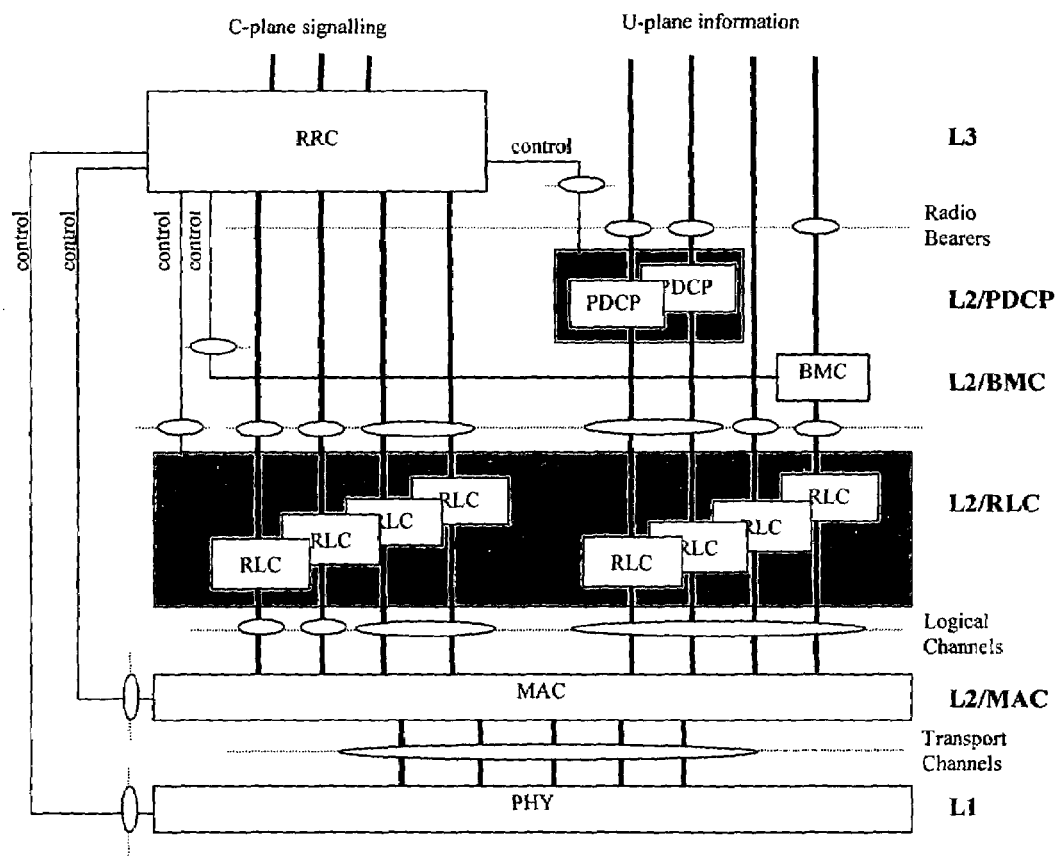
FIG. 2 is a block diagram of a structure of a radio interface protocol between a terminal and a network based on 3GPP radio access network standards.
Figure 3:
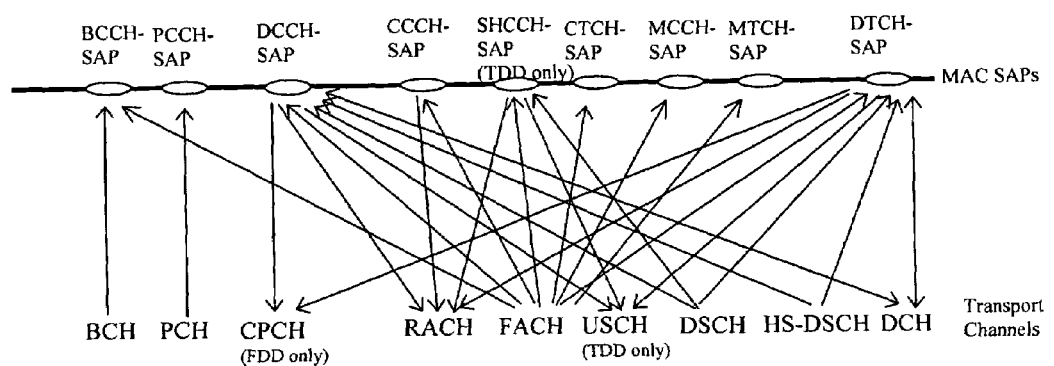
FIG. 3 illustrates the mapping of logical channels onto transport channels in the mobile terminal.
Figure 4:
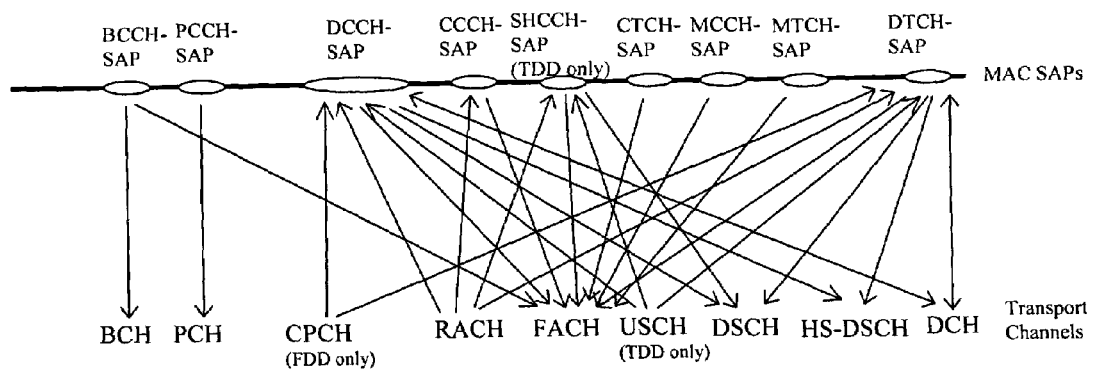
FIG. 4 illustrates the mapping of logical channels onto transport channels in the network.
Figure 5:
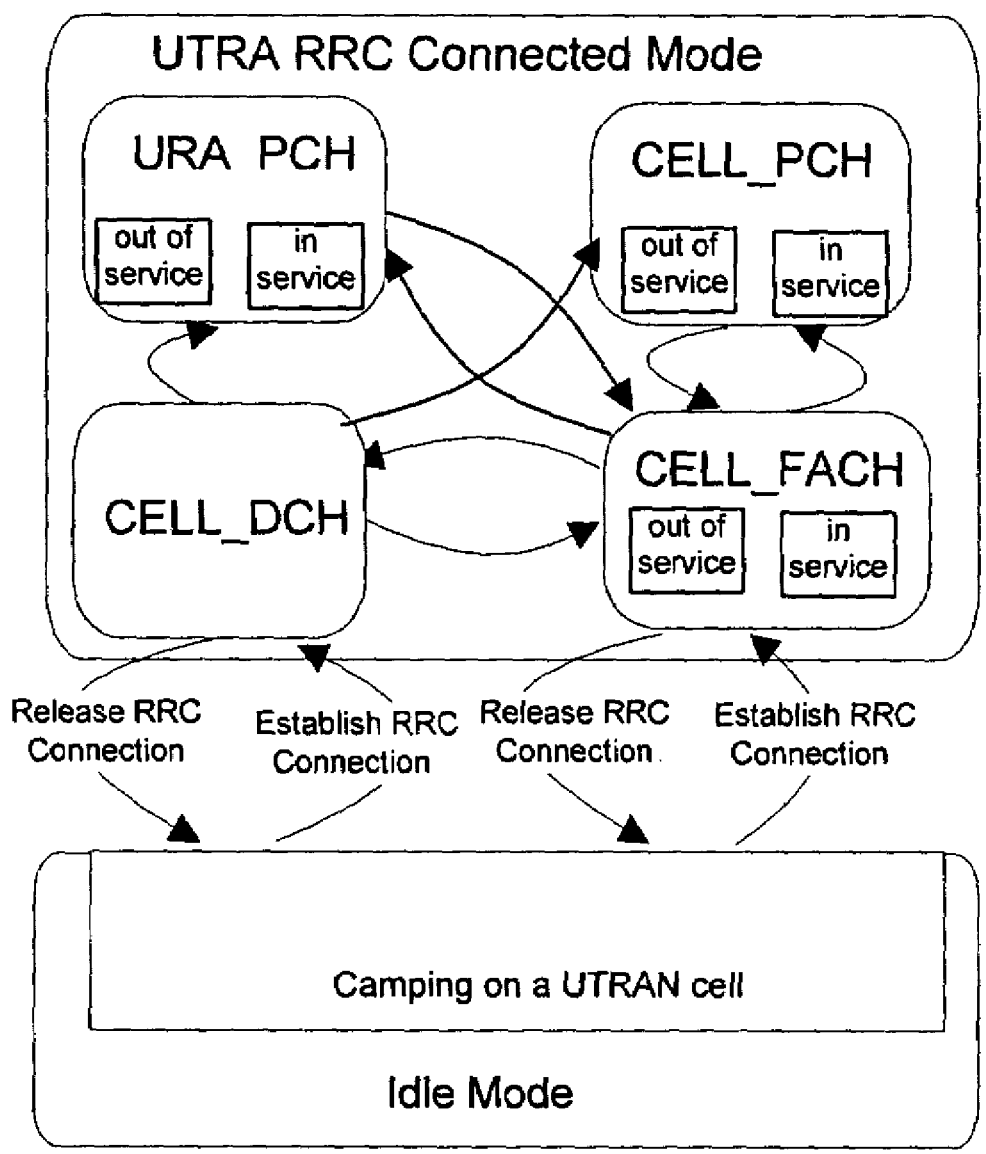
FIG. 5 illustrates possible transitions between modes and states in the UMTS network.
Figure 6:
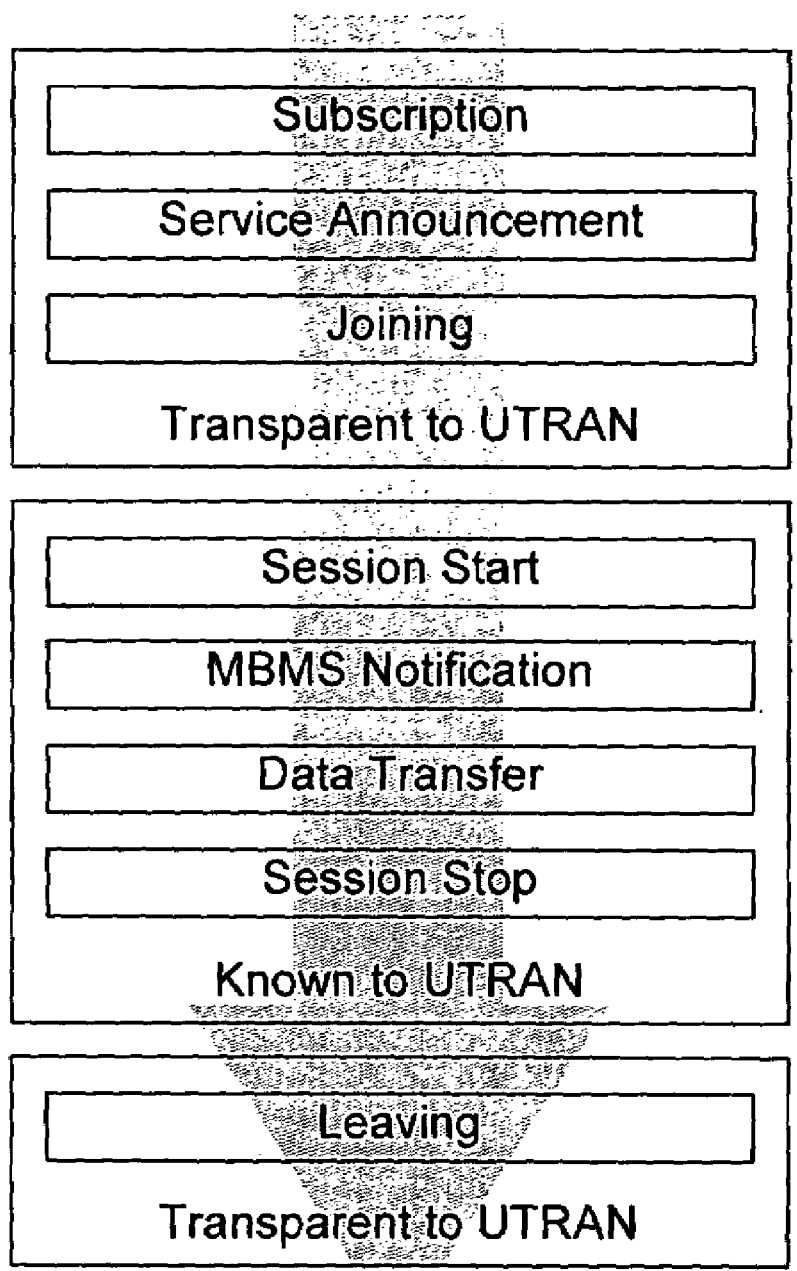
FIG. 6 illustrates a process of providing a particular point-to-multipoint service using a multicast mode.
Figure 7:
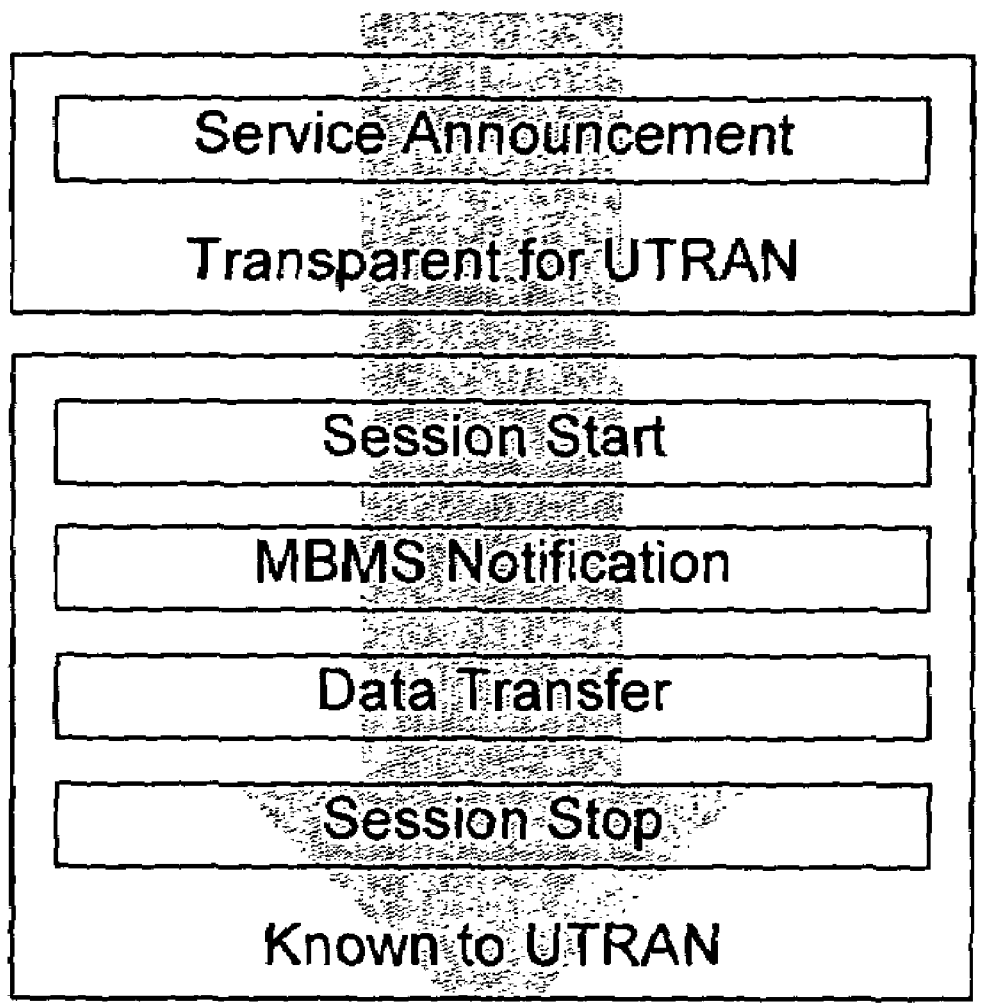
FIG. 7 illustrates a process of providing broadcast services.
Figure 8:
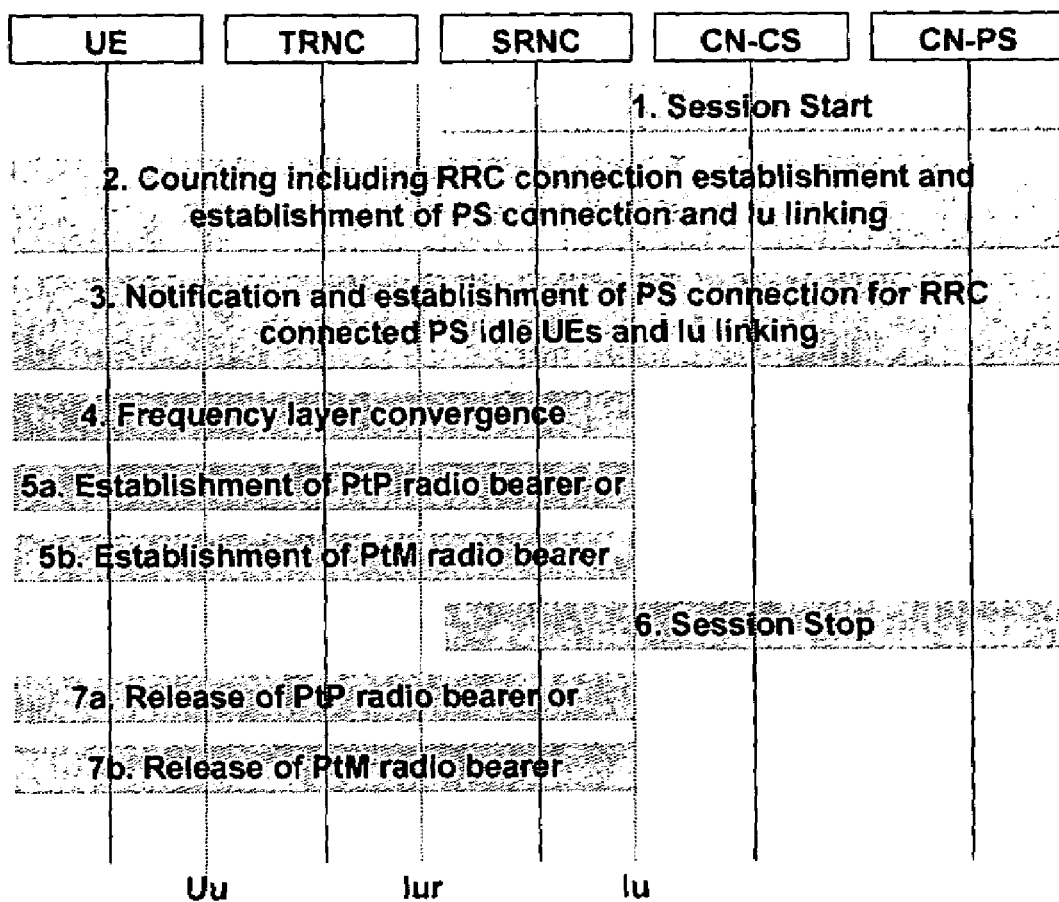
FIG. 8 illustrates a session sequence from a network perspective.
Figure 9:
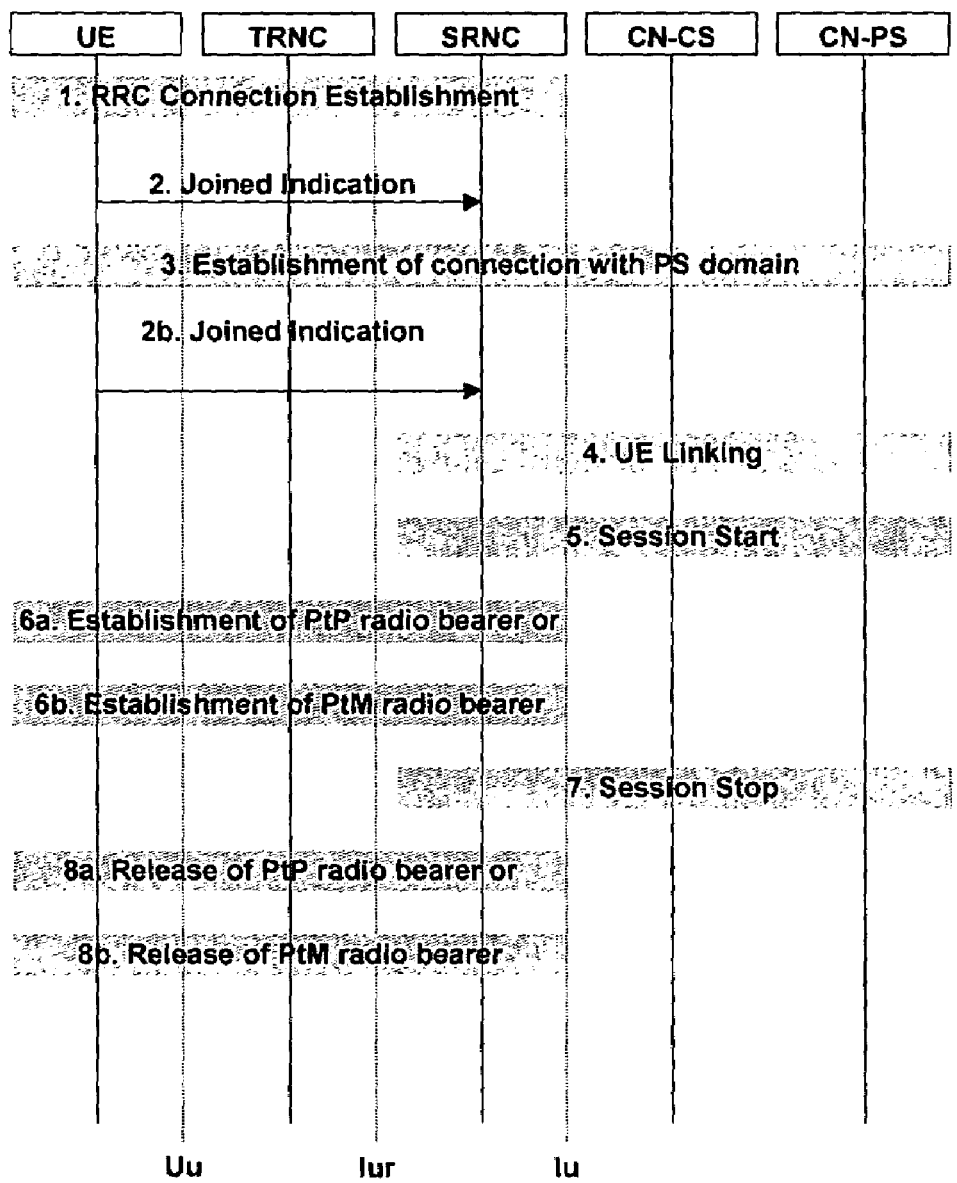
FIG. 9 illustrates a method for receiving in a target radio network controller (TRNC) information about services a mobile terminal has joined, wherein the mobile terminal is connected to the PS domain.
Figure 10:
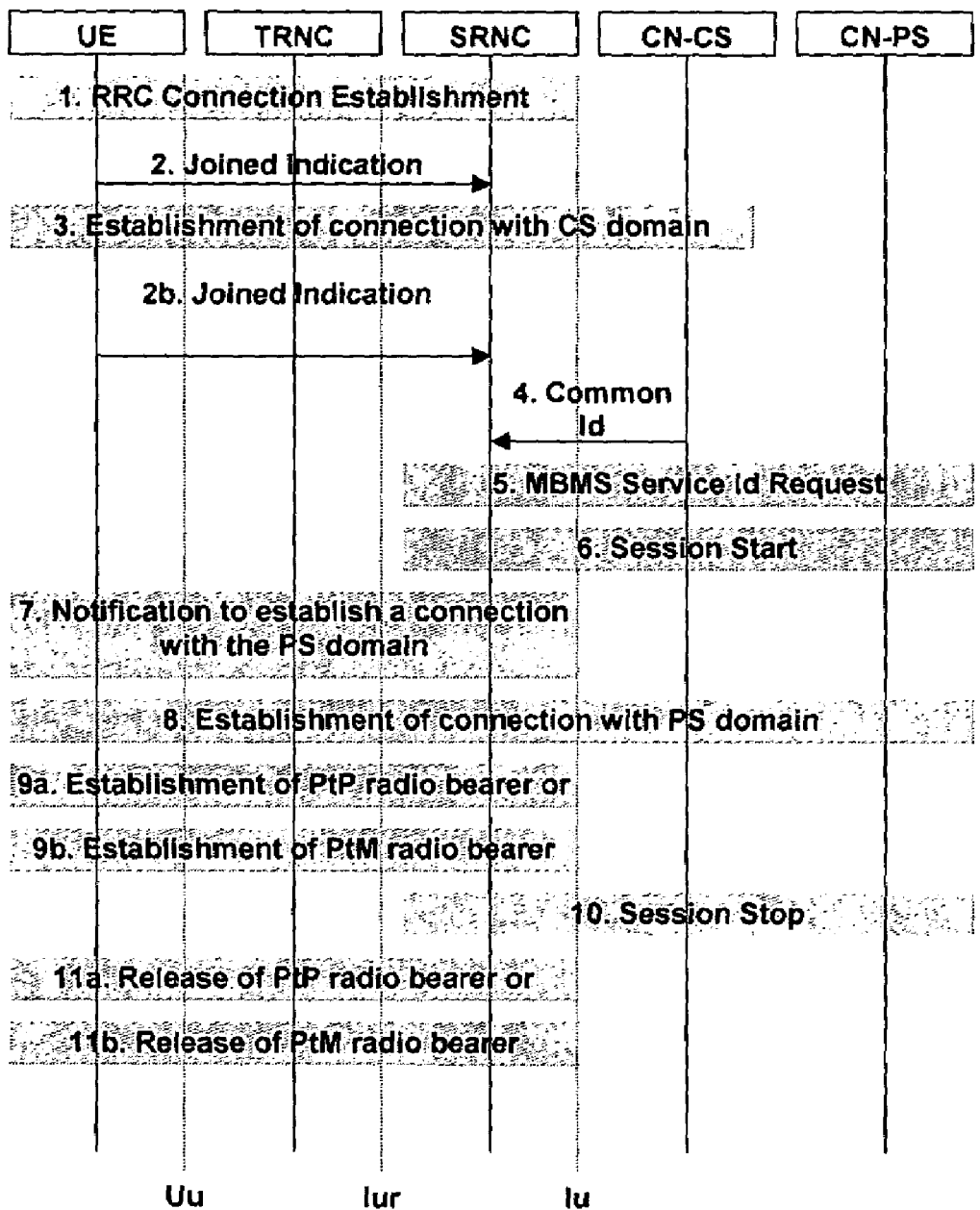
FIG. 10 illustrates a method for receiving in a TRNC information about services a mobile terminal has joined, wherein the mobile terminal is not connected to the PS domain.
Figure 11:
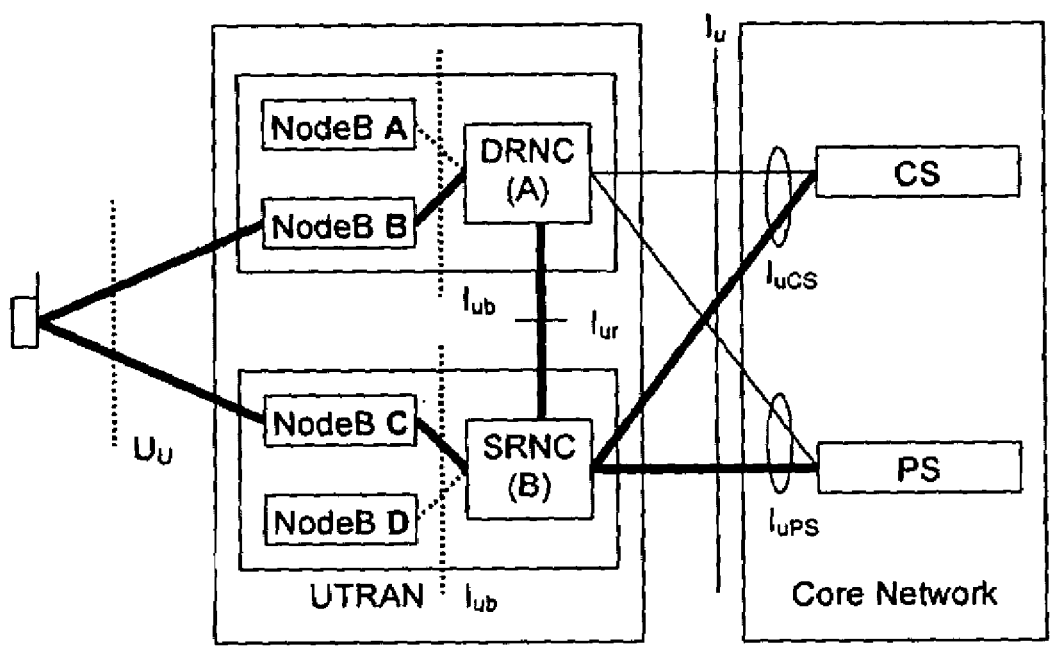
FIG. 11 illustrates an RRC-connected mobile terminal, which is connected to the PS domain and the CS domain.
Figure 12:
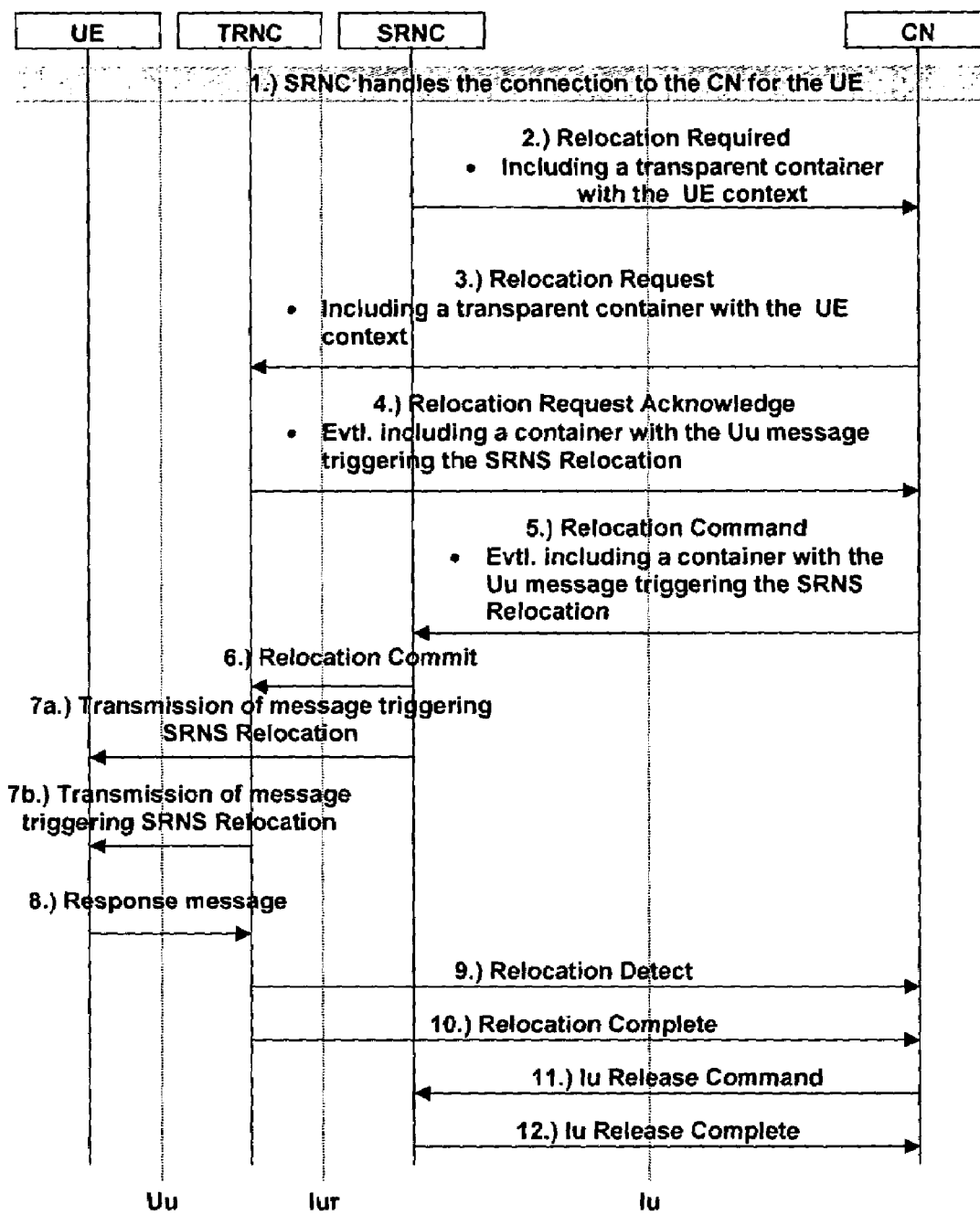
FIG. 12 illustrates a method for performing SRNS Relocation.
Figure 13:
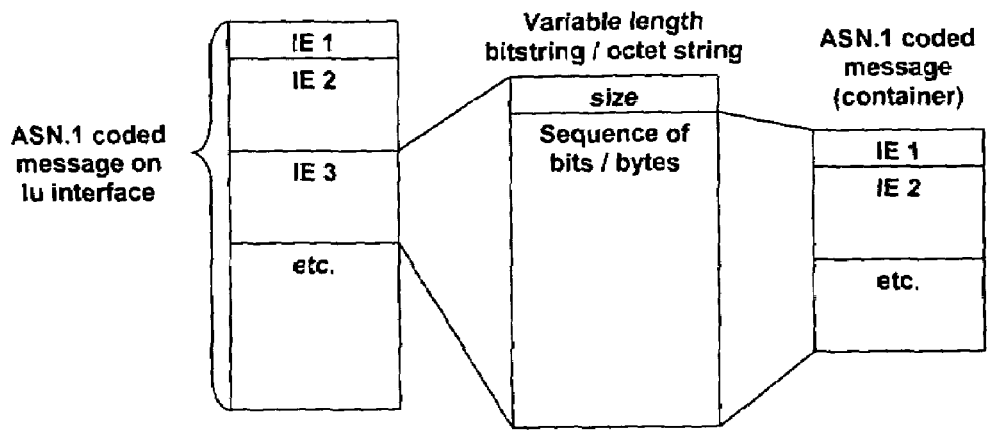
FIG. 13 illustrates coding of a message used in exchanging information.
Figure 14:
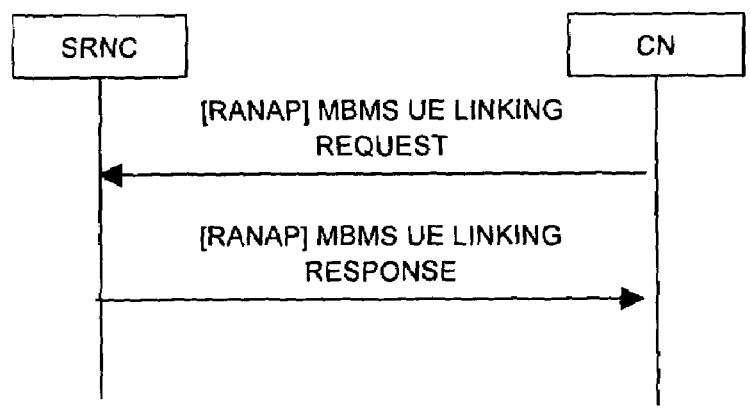
FIG. 14 illustrates a point-to-multipoint service mobile terminal linking procedure.
Figure 15:
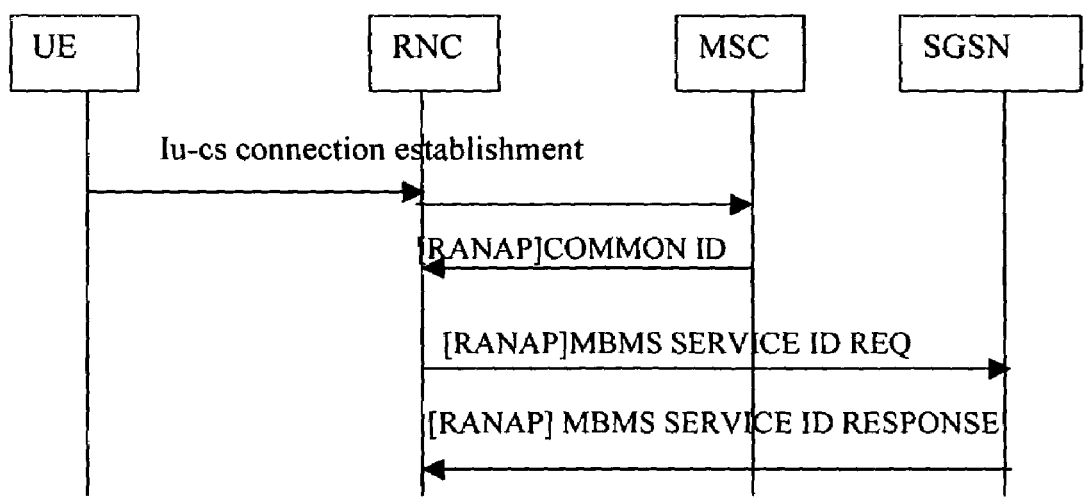
FIG. 15 illustrates transmitting a point-to-multipoint service ID list over a signaling flow.
Figure 16:
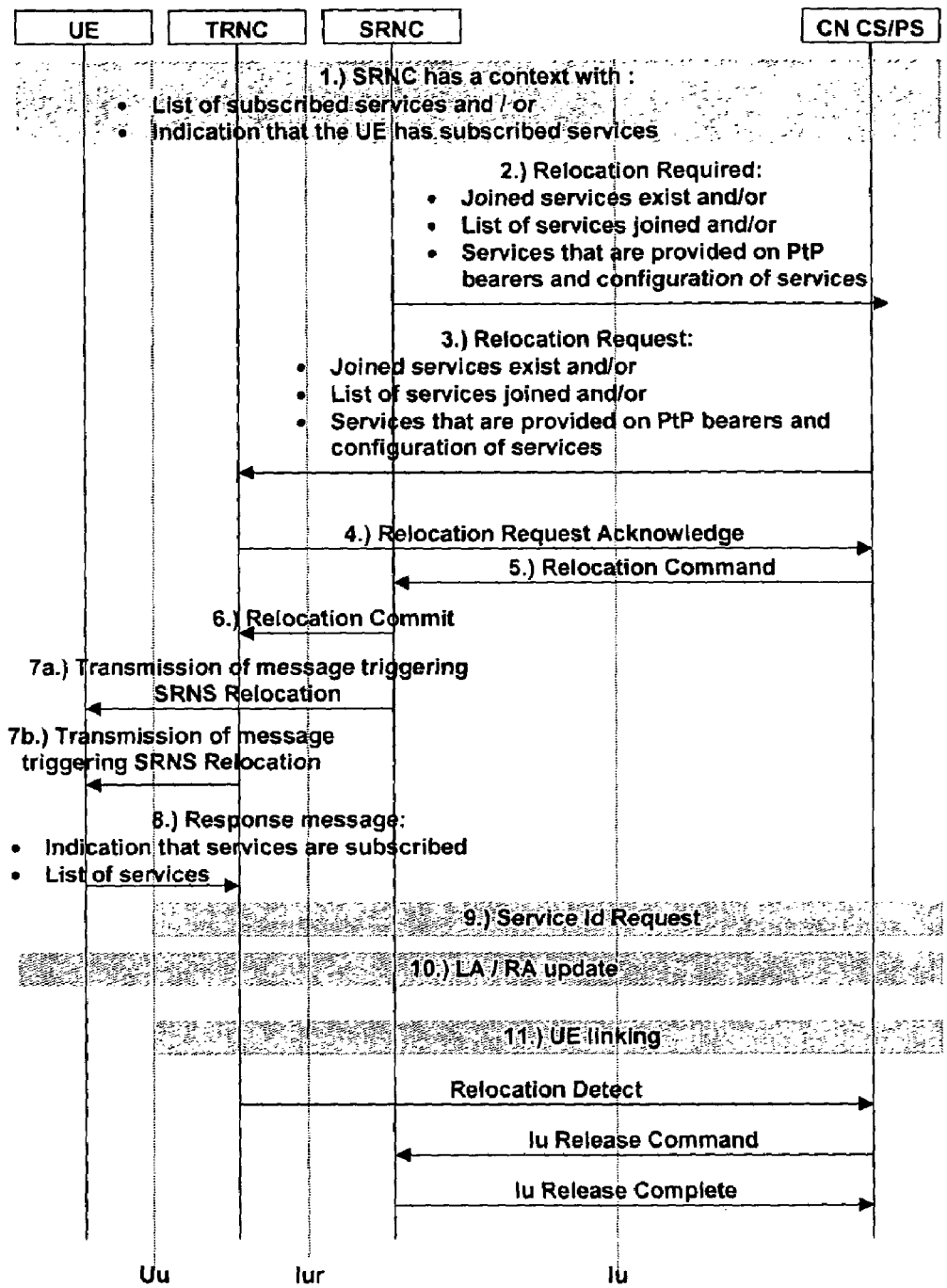
FIG. 16 illustrates transmitting information regarding a point-to-multipoint service a mobile terminal has joined to a TRNC during relocation in accordance with one embodiment of the present invention.

Referring to FIG. 16, a method for informing a target RNC about MBMS services a UE has subscribed to before SRNS Relocation in accordance with one embodiment of the present invention will be explained.

Initially, the SRNC is connected to a CS and/or a PS domain established for a given UE (step 1). If the UE is only CS-connected, the SRNC has received an indication that the UE has subscribed to MBMS services. Preferably, the SRNC receives this information via a Uu interface at establishment of the RRC/CN connection, such as inside an RRC Connection Request message, RRC Connection Setup Confirm message or initial direct transfer message. Preferably, the SRNC receives the list of services using an MBMS Service Id Request procedure. If the UE has a PS connection established, the SRNC receives information about the MBMS services the UE has subscribed to by a UE Linking procedure.

The SRNC initiates SRNS Relocation by sending a "Relocation Required" message to the CN (step 2). The SRNC includes a message container containing information regarding a current configuration of the UE (e.g. RRC state, measurement configurations, radio bearer configurations, transport channel configurations or physical channel configurations, etc.). Preferably, the message container is an information element (IE) handled in a transparent manner by the CN, i.e. the message container is not decoded. Rather, the message container is a string of octets having variable length and handled in a transparent manner by the CN. The "Relocation Required" message contains information whether the SRNS relocation is of a type "UE involved" or "UE not involved".

For MBMS, in accordance with the present invention, the message container comprises additional MBMS-specific information. For example, the message container may comprise an indication that the UE has joined at least one MBMS service. Furthermore, a list of MBMS services that the UE has joined may be included in the message container. The message container may also comprise radio bearer configurations, transport channel configurations or physical channel configurations that are configured for the UE for transmitting MBMS data, preferably via point-to-point (PtP) radio bearers. Additionally, information identifying the specific MBMS services the PtP radio bearers carry may also be included in the message container. Alternatively the MBMS-specific information, e.g. the information that the UE has joined at least one MBMS service could be included directly in the "Relocation Required" message.

Information inside the message container may be transmitted as an IE inside the container as a "SRNS Relocation Info" message. Thus, even when the UE is only connected to the CS domain, the target RNC will immediately be aware of the MBMS services the UE receives before the SRNS Relocation. This information is useful independently of whether an MBMS session is ongoing or not.

The CN informs the TRNC that SRNS Relocation is required by transmitting a "Relocation Request" message to the TRNC (step 3). This message includes the message container the CN received in the "Relocation Required" message. If the type of relocation is "UE involved," i.e., if the SRNC is the entity to transmit to the UE the RRC message that initiates the SRNS Relocation, this information is included directly in the "Relocation Request" message to the TRNC.

The target RNC then sends a "Relocation Request Acknowledge" message to the CN to confirm or reject the SRNS Relocation (step 4). In case the target RNC does not support a PtP bearer, or currently a specific MBMS Service is not provided via an Iu plane, and the relocation type is "UE involved," the target RNC may in a Uu message release the PtP radio bearer.

The CN sends a "Relocation Command" message to the SRNC to trigger the SRNS Relocation (step 5). If a transparent container having a message for triggering the SRNS Relocation was included in the "Relocation Request Acknowledge" message, the message of the transparent container is transmitted to the SRNC via the "Relocation Command" message.

In case an Iur interface exists, the SRNC sends a "Relocation Commit" message to the TRNC (step 6). Subsequently, if the type of SRNS Relocation is "UE involved," the SRNC transmits a Uu message to the UE for triggering the SRNS Relocation (step 7*a*). However, if the type of SRNS Relocation is "UE not involved," the TRNC transmits a Uu message to the UE for triggering the SRNS Relocation upon reception of the "Relocation Commit" message (step 7*b*). Preferably, the messages that trigger the SRNS Relocation are a "Cell Update" message, a "UTRAN Mobility Information" message, a "Radio Bearer Release" message, a "Radio Bearer Reconfiguration" message, a "Radio Bearer Setup" message, a "Transport Channel Reconfiguration" message, and a "Physical Channel Reconfiguration" message, for example. The UE knows that the SRNS Relocation is triggered by checking whether a "Downlink Counter Synchronisation" IE is included in the Uu message. However, this is not the case when the triggering message is the "Radio Bearer Reconfiguration" message. In this case, the UE knows that a reconfiguration is ongoing when a "New U-RNTI" IE is included in the Uu message.

Subsequently, the UE responds to the TRNC with a Response message to acknowledge the SRNS Relocation (step 8). Preferably, the UE may include in a complete message either an indication that the UE has subscribed to at least one MBMS service or a list of services the UE has subscribed to, wherein each service is identified by a specific MBMS service identifier. Possible UE response messages are a "Cell Update Complete" message, a "UTRAN Mobility Information Confirm" message, a "Radio Bearer Release Complete" message, a "Radio Bearer Reconfiguration Complete" message, a "Radio Bearer Setup Complete" message, a "Transport Channel Reconfiguration Complete" message, and a "Physical Channel Reconfiguration Complete" message, for example.

In case the TRNC only receives information about the services the UE has subscribed to, or an indication that a service is subscribed to in the Response message to the TRNC, and no PS connection exists, the TRNC initiates a Service Id Request (step 9). Afterward, the UE triggers a Location Area (LA)/Routing Area (RA) update once the SRNS Relocation is complete (step 10).

Therefore, the method of the present invention allows the target RNC to take into account the UE for transmitting MBMS services immediately after the SRNS Relocation. Accordingly, the interruption time in transmitting the MBMS service is minimized.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for transmitting information regarding a point-to-multipoint service a mobile terminal has joined to a target radio network controller (TRNC) before relocation, the method comprising:

informing a serving radio network controller (SRNC) of information regarding a point-to-multipoint service that the mobile terminal has joined;

receiving a relocation trigger for triggering the relocation; and transmitting a relocation acknowledgment to the TRNC for acknowledging the relocation;

wherein the relocation is initiated by a relocation required message transmitted from the serving radio network controller (SRNC) to a core network (CN) for requiring the relocation, the relocation required message comprising the information regarding the point-to-multipoint service that the mobile terminal has joined, wherein a relocation request is transmitted from the CN to the TRNC for requesting the relocation, the relocation request comprising the information regarding the point-to-multipoint service that the mobile terminal has joined, wherein the information regarding the point-to-multipoint service that the mobile terminal has joined comprises at least one of information indicating that the mobile terminal has joined at least one point-to-multipoint service, a list of point-to-multipoint services that the mobile terminal has joined, or point-to-point radio bearer configuration information for a point-to-multipoint service that the mobile terminal has joined that is provided via a point-to-point radio bearer, wherein the information regarding the point-to-multipoint service that the mobile terminal has joined is transmitted in a message container, wherein the message container comprises a current configuration of the mobile terminal comprising at least one of an RRC state, measurement configurations, radio bearer configurations, transport channel configurations, physical channel configurations, radio access bearer (RAB) information, or security related information, wherein the mobile terminal triggers a location area (LA)/routing area (RA) update once the relocation is complete, and wherein the relocation required message and the relocation request message comprise information for indicating that the SRNC will transmit the relocation trigger to the mobile terminal for triggering the relocation, wherein the relocation acknowledgment transmitted from the mobile terminal to the TRNC for acknowledging the relocation comprises at least information indicating that the mobile terminal has joined at least one point-to-multipoint service or a list of point-to-multipoint services that the mobile terminal has joined.

2. The method of claim 1, wherein a relocation request acknowledgment is transmitted from the TRNC to the CN for confirming or rejecting the relocation and a relocation command is transmitted from the CN to the SRNC for triggering the relocation.

3. The method of claim 1, wherein each service in the list of point-to-multipoint services is identified by a specific point-to-multipoint service identifier.

4. The method of claim 1, wherein the relocation trigger received by the mobile terminal for triggering the relocation is transmitted from the SRNC.

5. The method of claim 1, wherein the relocation trigger received by the mobile terminal for triggering the relocation is transmitted from the TRNC upon receiving in the TRNC a relocation commitment from the SRNC for committing the relocation.

6. The method of claim 1, wherein each service in the list of point-to-multipoint services is identified by a specific point-to-multipoint service identifier.

7. The method of claim 1, wherein the relocation is an SRNS Relocation.

8. A method for transmitting information regarding a point-to-multipoint service a mobile terminal has joined to a target radio network controller (TRNC) before relocation, the method comprising:

initiating the relocation by transmitting a relocation required message from a serving radio network controller (SRNC) to a core network (CN), wherein the relocation required message comprises the information regarding the point-to-multipoint service that the mobile terminal has joined;

transmitting a relocation request from the CN to the TRNC for requesting the relocation, wherein the relocation request comprises information regarding the point-to-multipoint service that the mobile terminal has joined;

transmitting a relocation request acknowledgment from the TRNC to the CN for confirming or rejecting the relocation;

transmitting a relocation command from the CN to the SRNC for triggering the relocation;

transmitting a relocation trigger to the mobile terminal for triggering the relocation; and receiving a relocation acknowledgment in the TRNC from the mobile terminal for acknowledging the relocation, wherein the information regarding the point-to-multipoint service that the mobile terminal has joined comprises at least one of information indicating that the mobile terminal has joined at least one point-to-multipoint service, a list of point-to-multipoint services that the mobile terminal has joined, or point-to-point radio bearer configuration information for a point-to-multipoint service that the mobile terminal has joined that is provided via a point-to-point radio bearer, wherein the information regarding the point-to-multipoint service that the mobile terminal has joined is transmitted in a message container, wherein the message container comprises a current configuration of the mobile terminal comprising at least one of an RRG state, measurement configurations, radio bearer configurations, transport channel configurations, physical channel configurations, radio access bearer (RAB) information, or security related information, wherein the mobile terminal triggers a location area (LA)/routing area (RA) update once the relocation is complete, and wherein the relocation required message and the relocation request message comprise information for indicating that the SRNC will transmit the relocation trigger to the mobile terminal for triggering the relocation, wherein the relocation acknowledgment received in the TRNC from the mobile terminal comprises at least information indicating that the mobile terminal has joined at least one point-to-multipoint service or a list of point-to-multipoint services that the mobile terminal has joined.

9. The method of claim 8, wherein each service in the list of point-to-multipoint services is identified by a specific point-to-multipoint service identifier.

10. The method of claim 8, wherein the message container is handled in a transparent way by the core network (CN).

11. The method of claim 8, wherein the relocation trigger transmitted to the mobile terminal for triggering the relocation is transmitted from the SRNC.

12. The method of claim 8, wherein the relocation trigger transmitted to the mobile terminal for triggering the relocation is transmitted from the TRNC upon receiving in the TRNC a relocation commitment from the SRNC for committing the relocation.

13. The method of claim 8, wherein each service in the list of point-to-multipoint services is identified by a specific point-to-multipoint service identifier.

14. The method of claim 8, wherein the relocation is an SRNS Relocation.

\* \* \* \* \*